(12) United States Patent
Egedal (10) Patent No.: US 10,934,997 B2
(45) Date of Patent: Mar. 2, 2021

(54) DAMPING WIND TURBINE TOWER OSCILLATIONS

(71) Applicant: Siemens Gamesa Renewable Energy A/S, Brande (DK)

(72) Inventor: Per Egedal, Herning (DK)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 0 days.

(21) Appl. No.: 16/345,039

(22) PCT Filed: Sep. 13, 2017

(86) PCT No.: PCT/EP2017/072968
§ 371 (c)(1),
(2) Date: Apr. 25, 2019

(87) PCT Pub. No.: WO2018/077530
PCT Pub. Date: May 3, 2018

(65) Prior Publication Data
US 2019/0277256 A1    Sep. 12, 2019

(30) Foreign Application Priority Data
Oct. 28, 2016 (DE) ............... 10 2016 221 356.3

(51) Int. Cl.
*F03D 7/02* (2006.01)
*H02P 9/00* (2006.01)
*H02P 101/15* (2016.01)

(52) U.S. Cl.
CPC ......... *F03D 7/0296* (2013.01); *F03D 7/0272* (2013.01); *H02P 9/008* (2013.01);
(Continued)

(58) Field of Classification Search
CPC ...... F03D 7/0296; F03D 7/0272; H02P 9/008; H02P 2101/15; F05B 2260/96;
(Continued)

(56) References Cited

U.S. PATENT DOCUMENTS 7,939,956 B1* 5/2011 Larsen .................... F03D 17/00
290/44
2006/0066111 A1* 3/2006 Suryanarayanan ... F03D 7/0272
290/44

(Continued)

FOREIGN PATENT DOCUMENTS

CN      201843730 U     5/2011
CN      102155989 A     8/2011
(Continued)

OTHER PUBLICATIONS

International Search Report for international application No. PCT/EP2017/072968 dated Dec. 21, 2017.
(Continued)

*Primary Examiner* — Charles Reid, Jr.
(74) *Attorney, Agent, or Firm* — Schmeiser, Olsen & Watts LLP (57) ABSTRACT

Provided is a method for damping a side-side oscillation of a tower of a wind turbine having a generator connected to a converter, the method including: measuring an acceleration value of the tower; determining, based on the acceleration value, at least one frequency value of at least one tower oscillation mode, including a second tower oscillation mode; controlling the converter of the wind turbine based at least on the acceleration value and the frequency value.

19 Claims, 3 Drawing Sheets

(52) U.S. Cl.
CPC ..... *F05B 2260/96* (2013.01); *F05B 2260/964* (2013.01); *F05B 2270/10* (2013.01); *F05B 2270/334* (2013.01); *H02P 2101/15* (2015.01); *Y02E 10/72* (2013.01)

(58) Field of Classification Search
CPC ............ F05B 2260/964; F05B 2270/10; F05B 2270/334; Y02E 10/723
USPC .................................................... 290/44, 55
See application file for complete search history.

(56) References Cited

U.S. PATENT DOCUMENTS

| | | | | |
|---|---|---|---|---|
| 2009/0250932 | A1* | 10/2009 | Egedal | F03D 7/0224 290/44 |
| 2009/0292397 | A1* | 11/2009 | Bjerge | F03D 7/0272 700/280 |
| 2010/0013235 | A1* | 1/2010 | Bjerge | F03D 7/0272 290/55 |
| 2016/0377058 | A1* | 12/2016 | Caponetti | F03D 7/0224 416/1 |

FOREIGN PATENT DOCUMENTS

| | | |
|---|---|---|
| CN | 20215790 U | 3/2012 |
| CN | 204458220 U | 7/2015 |
| EP | 1643122 A2 | 4/2006 |
| EP | 2620639 A1 | 7/2013 |
| EP | 2743500 A1 | 6/2014 |
| EP | 2746483 A1 | 6/2014 |
| WO | 2014040598 A1 | 3/2014 |
| WO | 2018077530 A1 | 5/2018 |

OTHER PUBLICATIONS

International Search Report for application No. PCT/EP2017/072968.
Office Action in corresponding Chinese Patent Application No. 201780066837.8 dated Nov. 11, 2020. 19 pages.
Cao, Guangqi, et al., "Self-Oscillation Property Analysis of an Offshore Wind Turbine Support Structure on the basis of a Five-Pile Jacket Structure," Journal of Shanghai Electric Technology; vol. 9; No. 1; pp. 59-62; 2016; 13 pages.

* cited by examiner

DAMPING WIND TURBINE TOWER OSCILLATIONS

CROSS-REFERENCE TO RELATED APPLICATIONS

This application claims priority to PCT Application No. PCT/EP2017/072968, having a filing date of Sep. 13, 2017, which is based on German Application No. 10 2016 221 356.3, having a filing date of Oct. 28, 2016, the entire contents both of which are hereby incorporated by reference.

FIELD OF TECHNOLOGY

The present embodiments of the invention relate to a method and to an arrangement for damping a side-side oscillation of a tower of a wind turbine.

BACKGROUND

A wind turbine may comprise a wind turbine tower, a nacelle mounted on top of the wind turbine tower, wherein the nacelle may support a rotor having plural rotor blades connected thereto and being connected mechanically to an electric generator which generates electric energy upon rotation of the rotor. Due to excitation by environmental influence, like wind, and/or rotation of the rotor including the blades with particular speed, the wind turbine tower may oscillate. These oscillation movements of the tower may result in big loads in components of the wind turbine, such as the yaw system, a gearing system and the tower integrity or tower construction itself.

Conventionally, active damping of the tower oscillation has been performed. For example, in the fore-aft direction (along the wind direction), the oscillations may have conventionally effectively been damped by the blades and their aerodynamic profile or aerodynamic influence when the turbine is in operation. However, thereby, any side-side oscillation may not be effectively reduced.

The European patent application EP 2 620 639 discloses a method for damping oscillations in a wind turbine, wherein a fore-aft oscillation of the tower in the direction of the X-axis is monitored, at the second or higher bending mode frequency. Further, a compensating torque is determined for at least partly damping the oscillation and for each rotor blade of the wind turbine an adjustment of the pitch angle suitable to generate said compensating torque is determined. Finally, the pitch angle is adjusted to generate at least part offset compensating torque.

It has however been observed, that the conventional methods and arrangements for damping tower oscillations are either rather complicated, cumbersome, require complex methodology or are not capable of addressing all kinds of oscillation modes of a tower oscillation.

Thus, there may be a need for a method and for an arrangement for damping a side-side oscillation of a tower of a wind turbine, which is easily performed, and is capable of counteracting oscillations of the tower which have not been dampened using the conventional methods and systems.

SUMMARY

According to an embodiment of the present invention it is provided a method for damping a side-side oscillation of a tower of a wind turbine having a generator connected to a converter, the method comprising measuring an acceleration value of the tower, determining, based on the acceleration value, at least one frequency value of at least one tower oscillation mode, including a second tower oscillation mode, and controlling the converter of the wind turbine based at least on the acceleration value and the frequency value.

The method may for example be performed by a wind turbine controller and may be implemented in hardware and/or software. The side-side oscillation of the tower refers to an oscillation (for example periodic motion) in a direction perpendicular to a plane which is spanned by the rotor axis and a longitudinal axis of the wind turbine tower. The generator may for example comprise a permanent magnet synchronous generator. The converter may comprise a AC-DC portion, a DC link, and a DC-AC portion which is connected (possibly via one or more transformers) to a utility grid. The AC-DC portion as well as the DC-AC portion of the converter may each comprise plural power switches, such as IGBTs which may receive gate driver signals, such as pulse width modulation signals. The power output of the wind turbine may be characterized by a particular voltage, active power, reactive power, phase angle between current and voltage and a frequency. The characteristics of the output power may be governed by control of the converter. The converter may for example be controlled via supply of an input signal, for example representing a desired power output, such as desired active power, desired reactive power and desired voltage.

The acceleration value of the tower may be acquired or measured using an accelerometer or one or more accelerometers which may be installed within (potentially different locations of) the wind turbine tower and/or which may be installed in the nacelle. In particular, in order to be capable of measuring different oscillation modes of the tower, plural acceleration values may be measured at plural locations (for example distributed along a longitudinal direction of the wind turbine tower). The tower may for example oscillate in a first structural mode which may have been considered in conventional systems and methods for damping the tower oscillations. The tower, in particular a very tall tower, may furthermore also oscillate in the second structural mode which may not have been considered in conventional methods and systems.

The first mode of oscillation may comprise a movement of the upper tip of the tower, while the lower portions of the tower move less and less the closer they are located from a foundation or a ground. At the foundation, the movement of the tower may substantially be zero in the first mode of oscillation.

The second mode of oscillation may be characterized by movements of the tower, wherein a deviation from an ideal position along a vertical line may increase from the foundation towards a middle portion of the tower and may decrease from the middle portion of the tower towards the top of the wind turbine tower.

The first mode of oscillation may have a frequency for example in a range of 0.2 Hz to 0.4 Hz and the second mode of oscillation may have a frequency between 1 Hz and 3 Hz, in particular around 2 Hz, wherein these frequencies may depend on the length of the tower, the material used to build the tower and the structural design of the wind turbine tower. The frequencies of the first mode as well as the second mode of oscillation may be calculated from simulations of the wind turbine tower.

In particular, the damping method may derive, from the measured acceleration value(s) (in particular measured for different time points), an amplitude and a frequency and also a phase of the oscillation mode, in particular the second tower oscillation mode, or several different tower oscillation modes. When the amplitude, the frequency and the phase of the second tower oscillation mode (and potentially further tower oscillation modes) are known, the converter may be controlled such that the generator (connected to the converter) generates a torque which counteracts the second tower oscillation mode and/or the several different tower oscillation modes. For example, a power reference may be supplied to the converter being modulated to have the same frequency as the second tower oscillation mode, having a phase shifted by 90° or 180° relative to a displacement of the tower or a movement or velocity of the tower and having an appropriate amplitude to counteract the second tower oscillation mode.

According to an embodiment of the present invention, the controlling the converter comprises filtering the measured acceleration value based on the value of the frequency, performing a phase adjustment of the filtered acceleration value, multiplying the phase adjusted filtered acceleration value with a modified power reference value and a soft clipper gain factor to obtain a power reference offset value, forming a sum of a power reference value and the power reference offset value subjected to a soft clipper, and supplying an input signal to the converter of the wind turbine, the input signal representing the sum.

Knowing the frequency of the second tower oscillation mode may enable to reduce noise in the acceleration value not pertaining to the oscillation mode desired to be damped. The phase adjustment may involve a trial and error method. The modified power reference value may be derived from a power reference value which may conventionally be supplied to the converter in order to output power in accordance to the power reference value. In alternative embodiments of the present invention, the power reference value may be replaced (or supplemented) with a voltage reference value. The power reference value may comprise an active power reference value and/or a reactive power reference value. The soft clipper gain factor may continuously or periodically be updated such that a sharp clipping of the power reference offset value may be avoided. When the sharp clipping is avoided, no undesired higher harmonics of the power reference offset value are introduced and used to control the converter. Thereby, undesired oscillations of the power output may be avoided. Thus, according to this embodiment, the (conventional) power reference value may be augmented with the power reference offset value which is subjected to a soft clipper and which is designed to counteract the second tower oscillation mode or even more tower oscillation modes.

According to an embodiment of the present invention, the soft clipper gain factor is (continuously) obtained by: supplying the power reference offset to a saturation block having an upper and a lower threshold to obtain the power reference offset subjected to the soft clipper, calculating a difference between the power reference offset and the power reference offset subjected to the soft clipper, and determining the soft clipper gain factor based on the difference, wherein the soft clipper gain factor is reduced if the difference increases.

The saturation block may ensure that the power reference offset value is modified, if the power reference offset value is outside the upper limit and the lower limit such that the output of the saturation block is within the upper limit and the lower limit. By continuously updating the soft clipper gain factor, a "soft clipping" procedure may be achieved, thereby avoiding or at least reducing higher harmonics in the power reference offset value.

According to an embodiment of the present invention, the soft clipper gain factor is further (continuously) obtained by: taking the absolute value of the difference, multiplying the absolute value of the difference with a previous gain factor to obtain a first product, multiplying the first product with another gain factor (Ts) to obtain a second product, forming another sum of the negative of the second product, the other gain factor and the gain factor, scaling the other sum to be between zero and one, and integrating the scaled other sum to obtain the gain factor.

According to an embodiment of the present invention, the reference offset value subjected to the soft clipper substantially is between the upper and the lower threshold and comprises substantially a sine or cosine signal having as frequency the determined frequency value of the at least one tower oscillation mode.

If the power reference offset value comprises substantially a sine or cosine signal, unwanted harmonics are reduced or even avoided which otherwise would lead to undesired oscillations of the power or output of the wind turbine.

According to an embodiment of the present invention, the modified power reference value is obtained by: band pass filtering the power reference value, low pass filtering the band pass filtered power reference value, multiplying the low pass filtered power reference value with a power reference gain.

The band pass filter may have filter thresholds defining a frequency range which may be centered at the frequency of the second tower oscillation mode. By these measures, the (conventional) power reference value may suitably be prepared for multiplication with the phase adjusted filtered acceleration value or in particular the phase adjusted filtered acceleration value which has been multiplied by a damp gain and the soft clipper gain factor.

According to an embodiment of the present invention, the phase adjustment of the filtered acceleration value is performed, in particular by trial and error, such that a torque generated by the generator due to the control of the converter, in particular switching of power transistors in the converter, counteracts the tower oscillation of the tower oscillation mode. Thereby, an effective damping may be achieved.

According to an embodiment of the present invention, the acceleration value relates to a side-side-acceleration value. Additionally, the method may damp a fore-aft oscillation mode by applying conventionally known methods.

According to an embodiment of the present invention, the determining the frequency value comprises: deriving a frequency domain representation, in particular by deriving a Fourier transform, of the acceleration value acquired over time, searching for a peak in a predetermined frequency range in the frequency domain representation.

In the frequency domain representation, the frequency value (which may be acquired over a particular time interval) may exhibit several peaks indicating different oscillation modes. From simulations or model calculations, a range may be known in which the second oscillation mode is expected or located in the frequency domain. The peak may be searched within this predetermined frequency range. If in the predetermined frequency range a peak is found, the peak position may be taken as the frequency value (for example of the second oscillation mode of the wind turbine tower).

According to an embodiment of the present invention, the determining the frequency value comprises: determining a first frequency value of a first tower oscillation mode, determining at least one second frequency value of at least one second tower oscillation mode, the method further comprising: performing the remaining steps for the first frequency value as well as for the second frequency value and adding all power reference offset values subjected to respective soft clippers to the power reference value to obtain the sum.

In particular, plural second frequency values for or relating to plural second oscillation modes may be determined. For each of the first frequency value and the one or more second frequency values, a soft clipping procedure may be performed each having its individual soft clipping gain factor. When all power reference offset values which are subjected to the respective soft clipper are added together to the power reference value, the converter may be effectively controlled to counteract all these different oscillation modes.

According to an embodiment of the present invention, measuring the acceleration value comprises: using accelerometer, in particular measuring acceleration perpendicular to a plane formed by a rotor axis and a tower longitudinal axis, installed in a nacelle mounted on top of the wind turbine tower.

In particular, two or more accelerators may be utilized for measuring the acceleration at different locations of the tower, in particular at different locations along a longitudinal direction of the tower. Thereby, the second oscillation mode may reliably be detected and in particular also its amplitude, phase and frequency.

According to an embodiment of the present invention, the second tower oscillation mode is characterized as having a lower movement at both longitudinal ends of the tower than in between the ends of the tower. In particular, the second tower oscillation mode may have increasing movements from both longitudinal ends of the tower towards a middle portion of the tower, where the movement may be maximal.

It should be understood that features, individually or in any combination, disclosed, described or mentioned with respect to a method for damping a side-side oscillation of a tower of a wind turbine may also, individually or in any combination, applied to an arrangement for damping a side-side oscillation of a tower of a wind turbine and vice versa, according to embodiments of the present invention.

According to an embodiment of the present invention it is provided an arrangement for damping a side-side oscillation of a tower of a wind turbine having a generator connected to a converter, the arrangement comprising: an accelerometer adapted to measure an acceleration value of the tower, a determining unit adapted to determine, based on the acceleration value, at least one frequency value of at least one tower oscillation mode, including a second tower oscillation mode, a driver adapted to control the converter of the wind turbine based at least on the acceleration value and the frequency value.

The arrangement may for example be comprised in a wind turbine controller or a park controller.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like member, wherein.

DETAILED DESCRIPTION

The illustration in the drawings is in schematic form.

Figure 1:
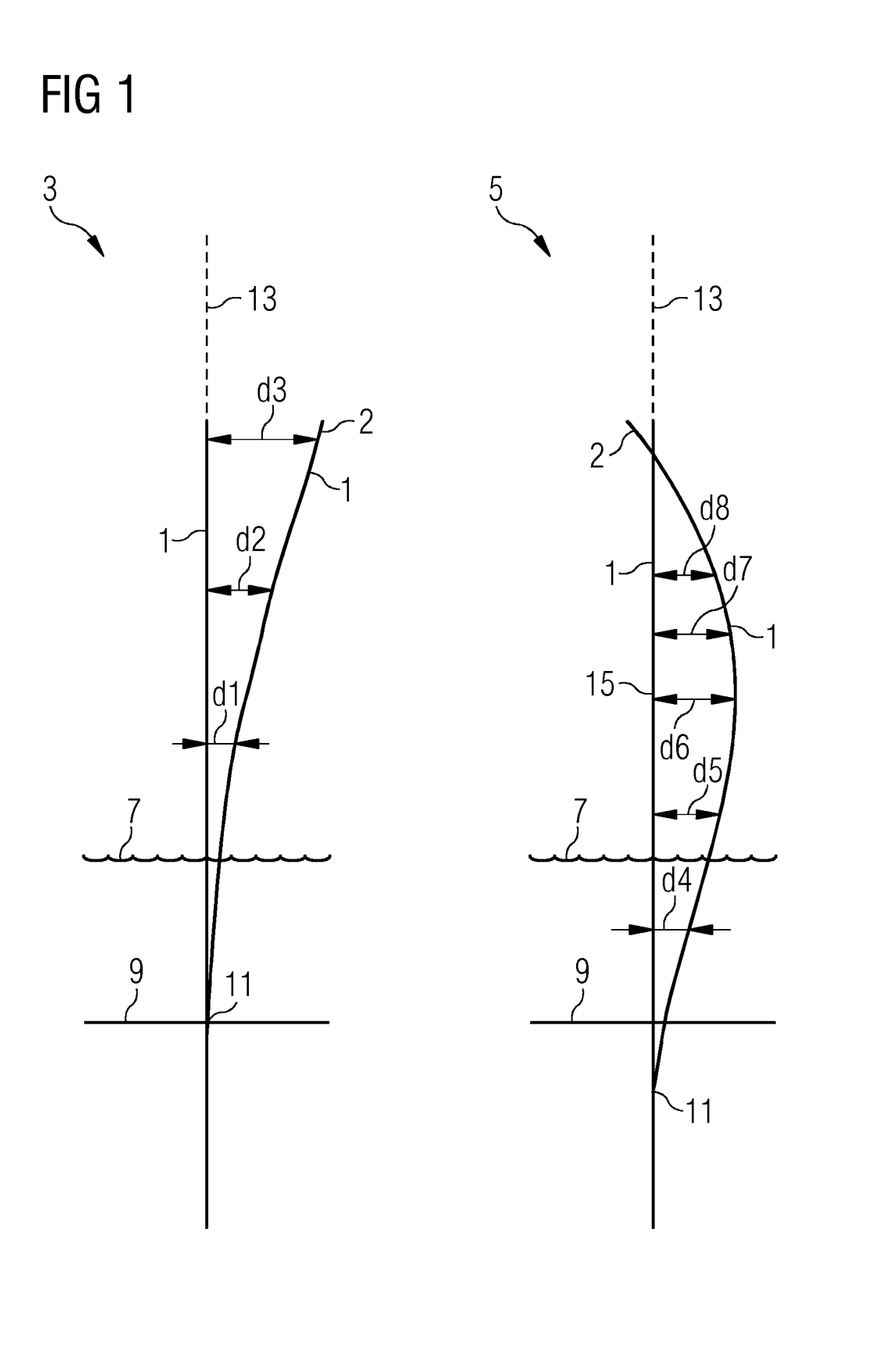
FIG. 1 schematically illustrates different vibration modes of a wind turbine tower.

FIG. 1 schematically illustrates different oscillation modes of a wind turbine tower 1. The illustration 3 thereby illustrates the first structural mode and the illustration 5 illustrates the second structural oscillation mode of the wind turbine tower 1. The turbine tower 1 is erected within soil and above the soil surface 7 and has a foundation 9 which is partly or entirely under the soil surface 7.

In the first oscillation mode as illustrated in the illustration 3 in FIG. 1, the bottom 11 of the tower 1 substantially does not move, but the higher the location above the foundation or above the soil surface 7 the larger the movement or the (horizontal) deviation d1, d2, d3 of the position of the oscillating tower 1 from the ideal vertical axis 13. Thus, in the first oscillation mode, the deviation (of the location of the tower 1 from the vertical axis 13) increases with increasing height as measured from the soil surface 7 or the foundation 9, thus, d1<d2<d3.

In the second mode of oscillation as illustrated in the illustration 5 in FIG. 1, the deviation of the tower 1 from the ideal vertical axis 13 also increases for increasing distance to the foundation 9 or the soil surface 7 but only up to a middle position 15 such that d4<d5<d6. However, for (higher) locations even farther away from the soil surface 7 than the position 15, the deviation of the wind turbine tower from the ideal vertical axis 13 decreases again towards the top 2 of the wind turbine tower, i.e. d6>d7>d8. Embodiments of the present invention are directed for damping oscillation of a wind turbine tower regarding the second oscillation mode.

Figure 2:
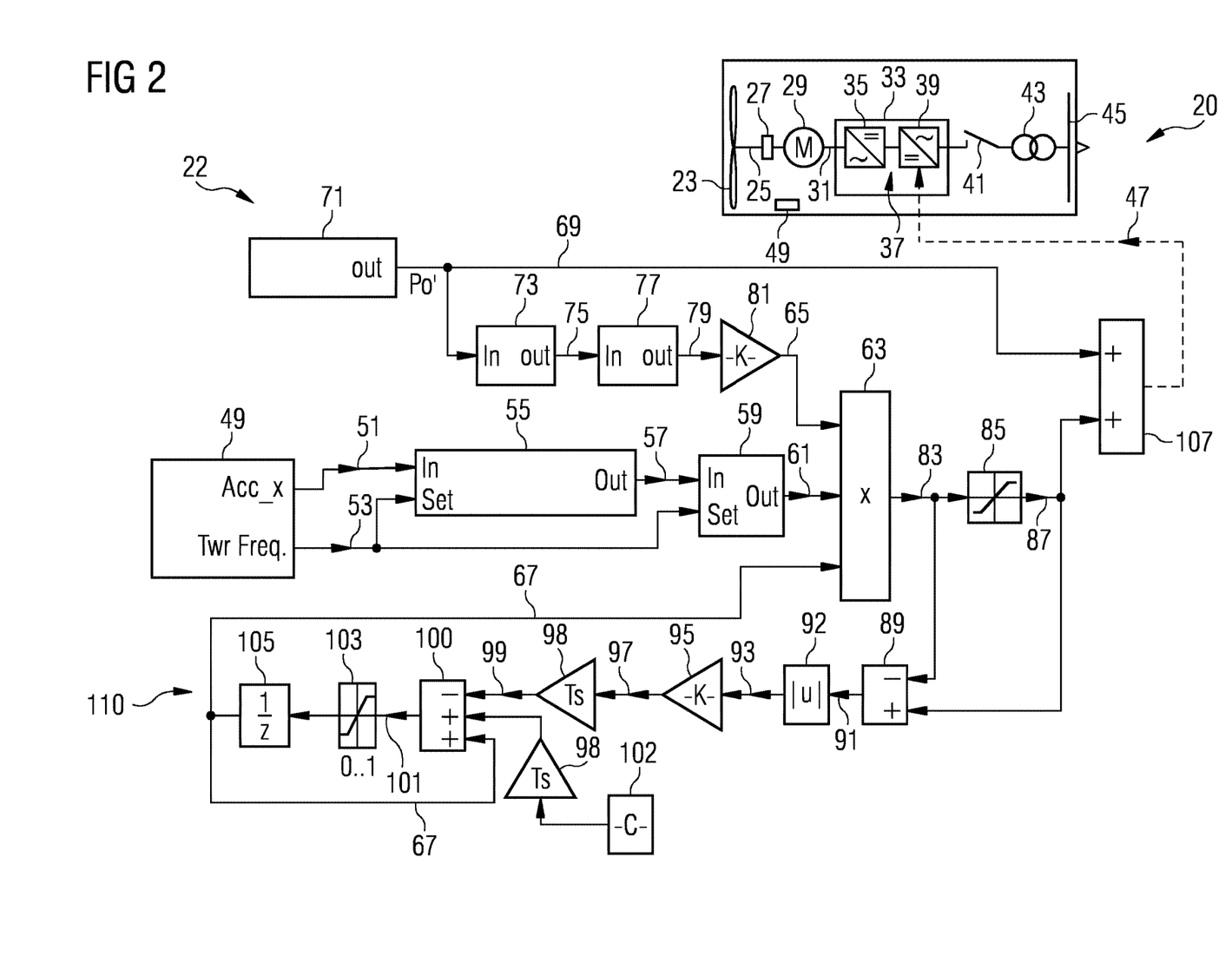
FIG. 2 schematically illustrates a wind turbine including an arrangement for damping a side-side oscillation of a tower of the wind turbine according to an embodiment of the present invention.

FIG. 2 schematically illustrates a wind turbine 20 according to an embodiment of the present invention including an arrangement 22 according to an embodiment of the present invention for damping a side-side oscillation of a tower 1 of the wind turbine 20. The wind turbine 20 comprises plural rotor blades 23 which are connected to a rotor shaft 25 which is, via an optional gearbox 27, connected to a generator 29 which outputs at output terminals 31 electric energy or electric power stream. The wind turbine 20 further comprises a converter 33 comprising a AC-DC portion 35, a DC link portion 37 and a DC-AC portion 39 which is, via a switch 41, connected to a wind turbine transformer 43 which secondary side is connected for example to a point of common coupling to which plural wind turbines are connected or which is directly connected to a utility grid 45.

The converter 33, in particular the grid side portion, is controlled via an input signal 47 which is output by the arrangement 22 for damping a side-side oscillation of the tower of the wind turbine 20. Thereby, the wind turbine 20 comprises, for example within a nacelle also harbouring the rotor shaft 25 and the generator 29, an accelerometer 49 which is adapted to measure an acceleration value Acc_x, also labelled with reference sign 51.

The accelerometer 49 is adapted to determine, based on the acceleration value 51 at least one frequency value TwrFrq (also denoted as 53) of at least one tower oscillation mode, including the second tower oscillation mode (as depicted in the illustration 5 in FIG. 1). The acceleration value 51 as well as the frequency value 53 are input in a filtering and phase adjustment module 55 which is adapted to filter the measured acceleration value 51 based on the frequency value 53 and to adapt a phase adjustment of the filtered acceleration value. The phase adjusted, filtered acceleration value is output as a value 57 from the filtering and phase adjustment module 55 and is input to a gain module 59 which further receives the frequency value 53 for defining a set point. The damp gain module 59 outputs a signal 61 which is supplied to a multiplication element 63. The multiplication element 63 further receives as input a modified power reference value 65 as well as a soft clipper gain factor 67.

Thereby, the modified power reference value 65 originates from a power reference value 69 output by a power controller 71. The power reference value 69 is subjected to a second mode band pass filter 73 outputting the filtered signal 75 which is supplied to a low pass filter 77 outputting the further filtered signal 79 which is supplied to a gain element 81 which multiplies the output signal 79 with a factor to arrive at the modified power reference value 65.

The multiplication element 63 outputs a power reference offset value 83 which is subjected to a saturation element 85 having upper and lower limits. The saturation element 85 outputs a power reference offset value subjected to a soft clipper 87. The power reference offset value subjected to a soft clipper 87 and the power reference offset value 83 are supplied to a difference element 89 which calculates a difference 91 between the power reference offset 83 and the power reference offset subjected to the soft clipper 87. Further, the absolute value 93 of the difference 91 is calculated by an absolute function block 92. The absolute value 93 is multiplied using the gain element 95 with a previous gain factor (K) to obtain a first product 97. The first product 97 is multiplied with another gain factor Ts using another gain module 98 to obtain a second product 99, which is input into element 100. Thereby, Ts is the sample time of the controller, also called the integration time step. Another sum 101 of the negative of the second product 99, the other gain factor Ts multiplied with 1/release time (provided by the generating element 102 for the signal 1/release time) and the gain factor 67 is formed. Thereby, the release time is the time for release of the soft clipper—how fast it should release after an saturation event. The other sum 101 is scaled using the scaling element 103 to be between 0 and 1 and the scaled other sum is integrated using the integration element 105 to obtain the gain factor 67. Thereby, 105 acts as a memory.

The thus obtained power reference offset value subjected to a soft clipper 87 is added, using the adding element 107 to the power reference value 69 in order to obtain the input signal 47 which is supplied as a control signal to the converter 33.

The vibration of the tower 1 may be measured by a G-sensor which may be placed for example at the top 2 of the tower 1 or in the nacelle of the wind turbine 20. The signal 51 from the G-sensor may be filtered to only pass the second tower mode through and may be delayed to get the optimal phase angle. Then the signal may be multiplied with the mean power reference to ensure that the tower damping power will scale with the mean power reference. The signal is then added to the power reference from other controllers, for example power controller 71 or speed controller.

To avoid a third harmonic of the second tower mode frequency, the output is saturated with a soft clipper function 110 which may reduce the gain if the tower damping output hits the saturation limit. The gain (e.g. K) may then slowly raised again.

Damping of vibrations of the second tower mode (or even further tower modes) may be achieved, according to embodiments of the present invention, by controlling the power set point whereby the torque may be oscillated and by oscillating with a power at the same frequency as the second tower mode oscillations, but an optimal phase-shift may force in the counter-direction of the tower. Thereby, an effective damping of the oscillations of the second tower mode may be achieved.

An advanced improvement by multiplying the tower vibration signal with the mean power reference may be that the damping power reference has a constant relation to the mean power. By using the torque as reference for the damping power reference, the relation between damping power reference and mean power reference may increase when the mean power is decreasing and the rotor speed is constant.

Figure 3:
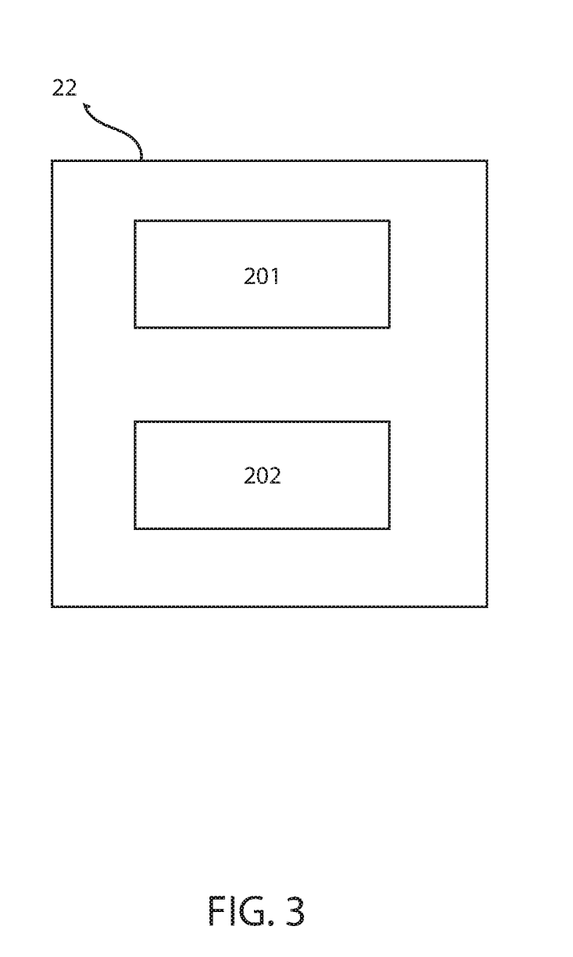
FIG. 3 depicts an arrangement according to embodiments of the present invention.

FIG. 3 shows an arrangement 22 including an accelerometer adapted to measure an acceleration value of the tower, a determining unit 201 adapted to determine, based on the acceleration value, at least one frequency value of at least one tower oscillation mode, including a second tower oscillation mode, a driver 202 adapted to control the converter of the wind turbine based at least on the acceleration value and the frequency value.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for damping a side-side oscillation of a tower of a wind turbine having a generator connected to a converter, the method comprising:
measuring an acceleration value of the tower;
determining, based on the acceleration value, at least one frequency value of at least one tower oscillation mode, including a second tower oscillation mode; and
controlling the converter of the wind turbine based at least on the acceleration value and the at least one frequency value;

wherein the second tower oscillation mode has a lower movement at both longitudinal ends of the tower than in between the ends of the tower.

2. The method according to claim 1, wherein the controlling the converter comprises:
   filtering the measured acceleration value based on the at least one frequency value;
   performing a phase adjustment of the filtered acceleration value;
   multiplying the phase adjusted filtered acceleration value with a modified power reference value and a soft clipper gain factor to obtain a power reference offset value;
   forming a sum of a power reference value and the power reference offset value subjected to a soft clipper; and
   supplying an input signal to the converter of the wind turbine, the input signal representing the sum.

3. The method according to claim 2, wherein the modified power reference value is obtained by:
   band pass filtering the power reference value;
   low pass filtering the band pass filtered power reference value; and
   multiplying the low pass filtered power reference value with a power reference gain.

4. The method according to claim 2, wherein the phase adjustment of the filtered acceleration value is performed, such that a torque generated by the generator due to the control of the converter counteracts the tower oscillation of the second tower oscillation mode.

5. The method according to claim 2, wherein the soft clipper gain factor is obtained by:
   supplying the power reference offset to a saturation block having an upper and a lower threshold to obtain the power reference offset subjected to the soft clipper;
   calculating a difference between the power reference offset and the power reference offset subjected to the soft clipper;
   and determining the soft clipper gain factor based on the difference, wherein the soft clipper gain factor is reduced if the difference increases.

6. The method according to claim 5, wherein the soft clipper gain factor is further obtained by:
   taking an absolute value of the difference;
   multiplying the absolute value of the difference with a previous gain factor to obtain a first product;
   multiplying the first product with another gain factor to obtain a second product;
   forming another sum of a negative of the second product, the other gain factor multiplied by an inverse of a release time and the gain factor;
   scaling the other sum to be between zero and one; and
   integrating the scaled other sum to obtain the soft clipper gain factor.

7. The method according to claim 5, wherein the power reference offset value subjected to the soft clipper substantially is between the upper and the lower threshold and comprises substantially a sine or cosine signal having as frequency the determined frequency value of the at least one tower oscillation mode.

8. The method according to claim 1, wherein the acceleration value relates to a side-side-acceleration value.

9. The method according to claim 1, wherein the determining the frequency value comprises:
   deriving a frequency domain representation by deriving a Fourier transform, of the acceleration value acquired over time; and
   searching for a peak in a predetermined frequency range in the frequency domain representation.

10. The method according to claim 1, wherein the determining the frequency value comprises:
    determining a first frequency value of a first tower oscillation mode; and
    determining at least one second frequency value of the second tower oscillation mode.

11. The method according to claim 1, wherein measuring the acceleration value comprises:
    using an accelerometer to measure acceleration perpendicular to a plane formed by a rotor axis and a tower longitudinal axis.

12. An arrangement for damping a side-side oscillation of a tower of a wind turbine having a generator connected to a converter, the arrangement comprising:
    an accelerometer adapted to measure an acceleration value of the tower;
    a determining unit adapted to determine, based on the acceleration value, at least one frequency value of at least one tower oscillation mode, including a second tower oscillation mode;
    a driver adapted to control the converter of the wind turbine based at least on the acceleration value and the frequency value;
    wherein the second tower oscillation mode has a lower movement at both longitudinal ends of the tower than in between the ends of the tower.

13. The wind turbine, comprising:
    the tower;
    the generator;
    the converter coupled to the generator; and
    the arrangement according to claim 12, connected to control the converter.

14. A method for damping a side-side oscillation of a tower of a wind turbine having a generator connected to a converter, the method comprising:
    measuring an acceleration value of the tower;
    determining, based on the acceleration value, at least one frequency value of at least one tower oscillation mode, including a second tower oscillation mode; and
    controlling of the converter of the wind turbine based at least on the acceleration value and the at least one frequency value, wherein the controlling the converter includes multiplying a phase adjusted filtered acceleration value with a modified power reference value and a soft clipper gain factor to obtain a power reference offset value.

15. The method according to claim 14, wherein the controlling of the converter further comprises:
    forming a sum of a power reference value and the power reference offset value subjected to a soft clipper; and
    supplying an input signal to the converter of the wind turbine, the input signal representing the sum.

16. The method according to claim 14, wherein the soft clipper gain factor is obtained by:
    supplying the power reference offset to a saturation block having an upper and a lower threshold to obtain the power reference offset subjected to a soft clipper;
    calculating a difference between the power reference offset and the power reference offset subjected to the soft clipper;
    and determining the soft clipper gain factor based on the difference, wherein the soft clipper gain factor is reduced if the difference increases;
    taking an absolute value of the difference;

multiplying the absolute value of the difference with a previous gain factor to obtain a first product;

multiplying the first product with another gain factor to obtain a second product;

forming a sum of a negative of the second product, the other gain factor multiplied by an inverse of a release time and the gain factor;

scaling the sum to be between zero and one; and integrating the scaled sum to obtain the soft clipper gain factor.

17. The method according to claim 16, wherein the power reference offset value subjected to the soft clipper substantially is between the upper and the lower threshold and comprises substantially a sine or cosine signal having as frequency the determined frequency value of the at least one tower oscillation mode.

18. The method according to claim 14, wherein the modified power reference value is obtained by:

band pass filtering the power reference value;

low pass filtering the band pass filtered power reference value; and multiplying the low pass filtered power reference value with a power reference gain.

19. The method according to claim 14, wherein the phase adjustment of the filtered acceleration value is performed, such that a torque generated by the generator due to the control of the converter counteracts the tower oscillation of the second tower oscillation mode.

* * * * *